No. 884,358. PATENTED APR. 14, 1908.
B. BONNIKSEN & F. A. CHANDLER.
ELECTRICALLY SYNCHRONIZED TIME MEASURING INSTRUMENT.
APPLICATION FILED AUG. 9, 1904.
5 SHEETS—SHEET 1.
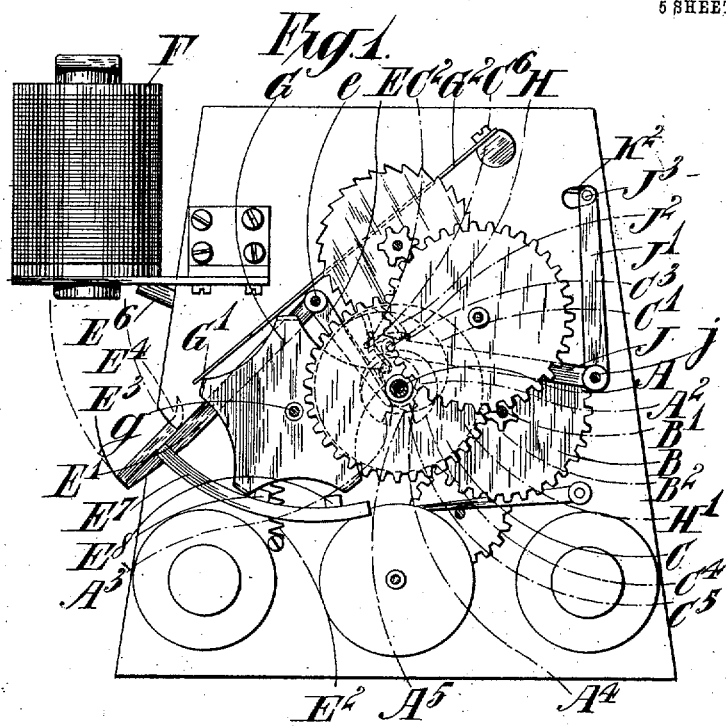
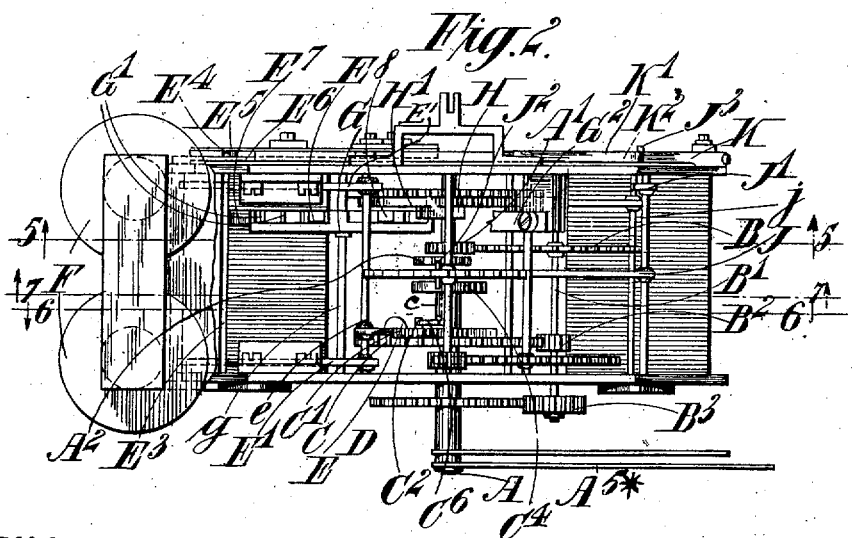
Witnesses.
Inventors:
Frederick A. Chandler
Bahne Bonniksen,
per Wm. E. Boulter
Attorney.

No. 884,358. PATENTED APR. 14, 1908.
B. BONNIKSEN & F. A. CHANDLER.
ELECTRICALLY SYNCHRONIZED TIME MEASURING INSTRUMENT.
APPLICATION FILED AUG. 9, 1904.

5 SHEETS—SHEET 2.

No. 884,358. PATENTED APR. 14, 1908.
B. BONNIKSEN & F. A. CHANDLER.
ELECTRICALLY SYNCHRONIZED TIME MEASURING INSTRUMENT.
APPLICATION FILED AUG. 9, 1904.

5 SHEETS—SHEET 3.

Witnesses.
Inventors

No. 884,358. PATENTED APR. 14, 1908.
B. BONNIKSEN & F. A. CHANDLER.
ELECTRICALLY SYNCHRONIZED TIME MEASURING INSTRUMENT.
APPLICATION FILED AUG. 9, 1904.

5 SHEETS—SHEET 4.

Witnesses.

Inventors
Frederick A. Chandler
Bahne Bonniksen
Wm E Boulter
Attorney.

No. 884,358. PATENTED APR. 14, 1908.
B. BONNIKSEN & F. A. CHANDLER.
ELECTRICALLY SYNCHRONIZED TIME MEASURING INSTRUMENT.
APPLICATION FILED AUG. 9, 1904.
5 SHEETS—SHEET 5.
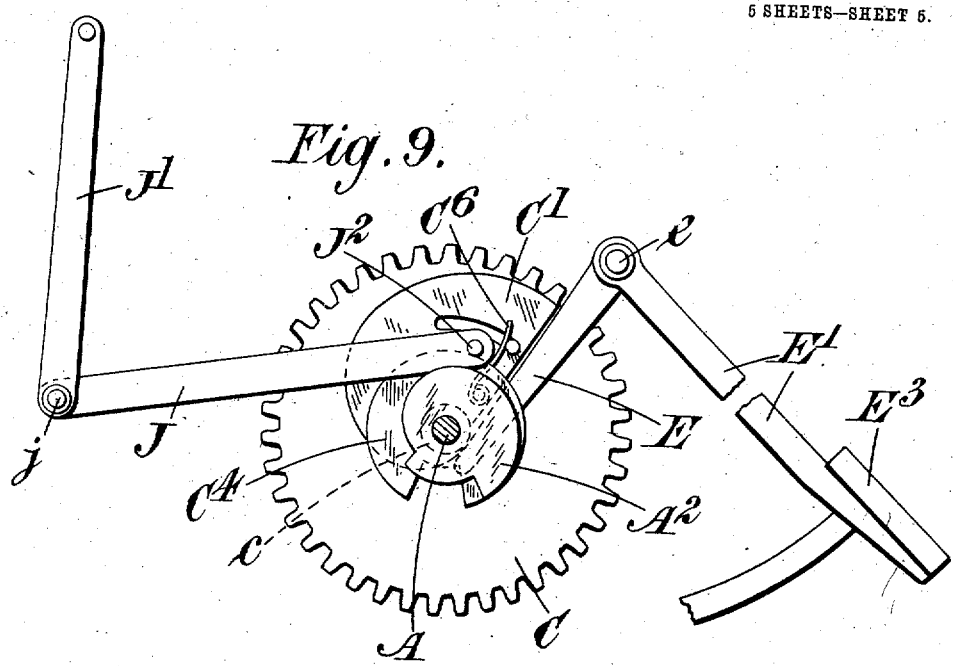
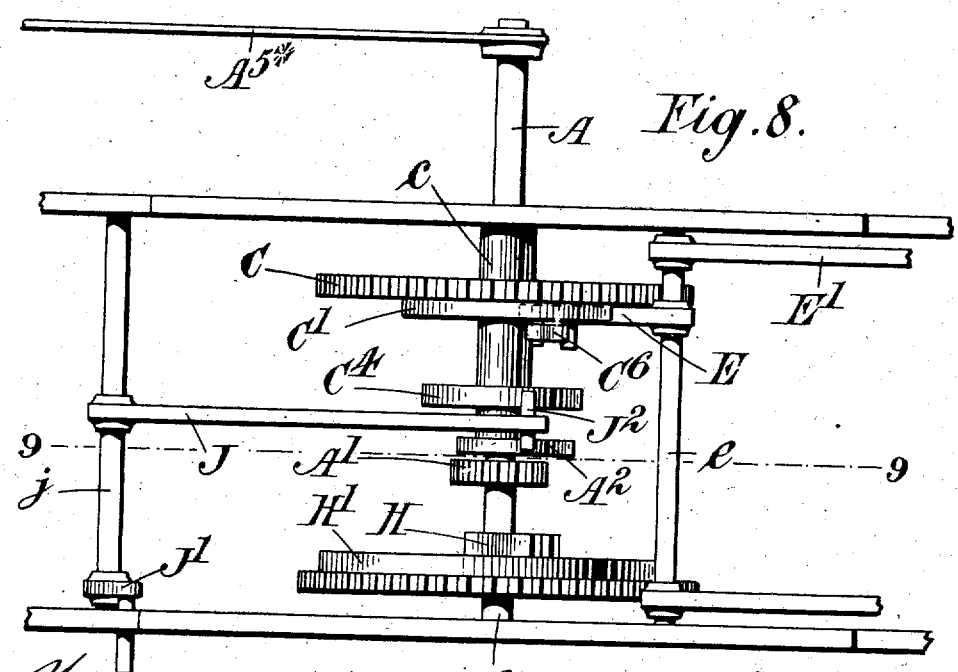

UNITED STATES PATENT OFFICE.

BAHNE BONNIKSEN, OF COVENTRY, AND FREDERICK AUGUSTUS CHANDLER, OF LEAMINGTON, ENGLAND.

ELECTRICALLY-SYNCHRONIZED TIME-MEASURING INSTRUMENT.

No. 884,358.   Specification of Letters Patent.   Patented April 14, 1908.

Application filed August 9, 1904. Serial No. 220,114.

*To all whom it may concern:*

Be it known that we, BAHNE BONNIKSEN, a subject of the King of Great Britain, and a resident of Coventry, Warwickshire, England, and FREDERICK AUGUSTUS CHANDLER, a subject of the King of Great Britain, and a resident of Leamington, Warwickshire, England, have invented a certain new and useful Improvement in Electrically-Synchronized Time-Measuring Instruments, of which the following is a specification.

This invention relates to electrically synchronized clocks and like time measuring instruments and consists in the combination and arrangement of parts hereinafter described and particularized in the claims appended to this specification.

Figure 4:
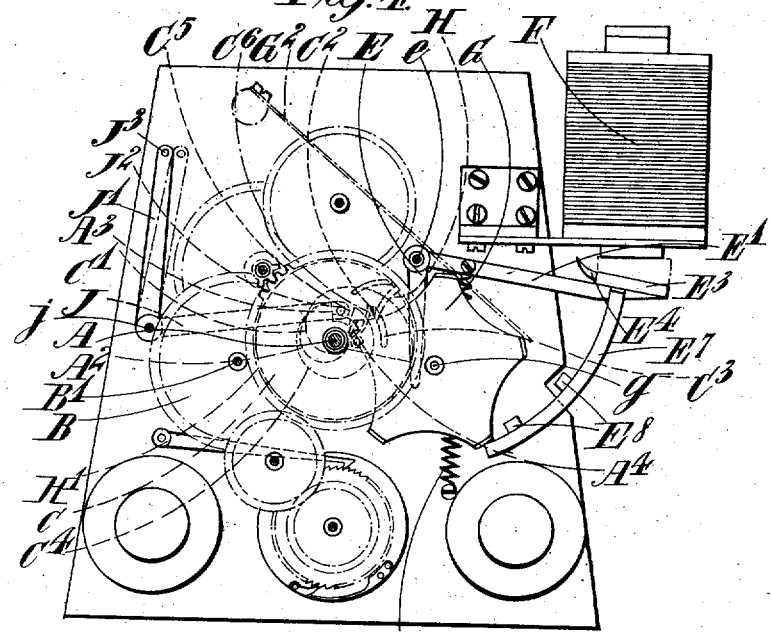
Figure 5:
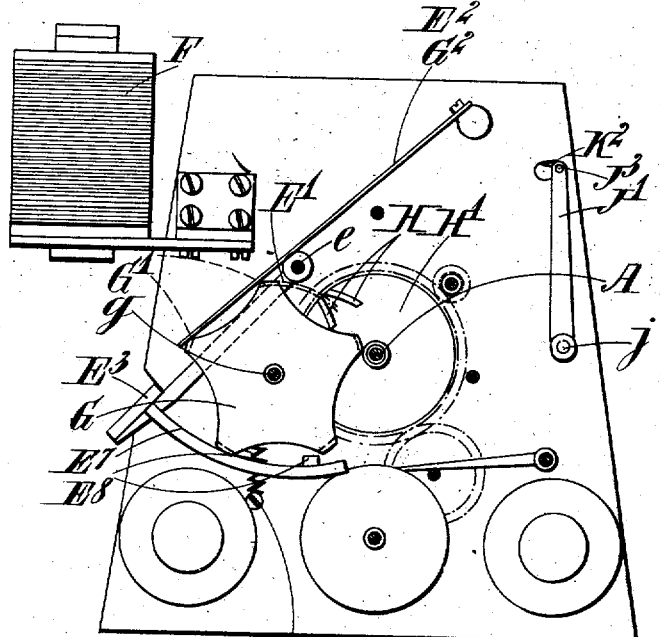
Figure 6:
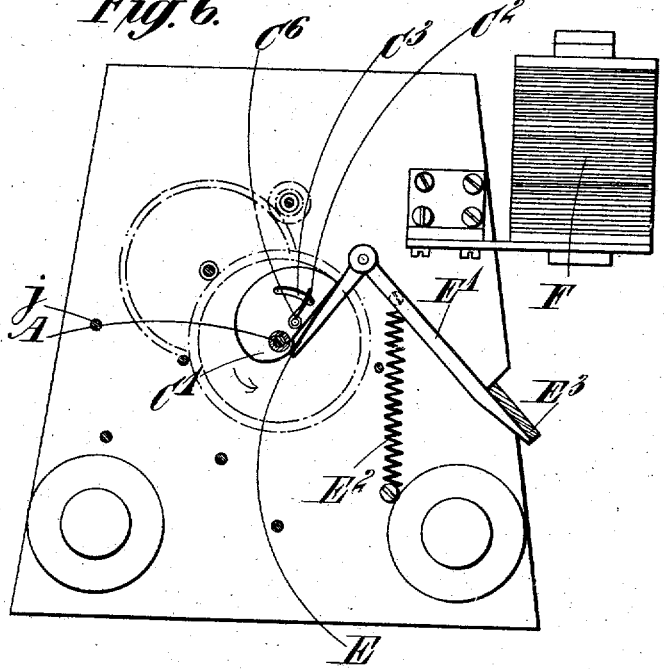
Figure 7:
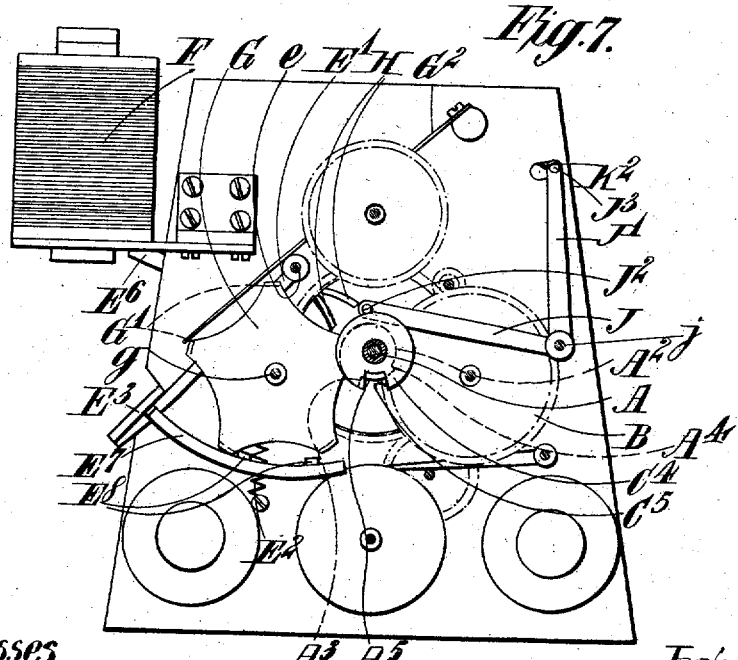

Referring to the accompanying drawings which illustrate a preferred embodiment of the present invention. Figure 1 is a front elevation of the mechanism viewed from behind the dial plate. Fig. 2 is a plan of Fig. 1, Fig. 3 is a rear elevation of the apparatus, Fig. 4 is a rear side elevation viewed from in front of the back plate. Fig. 5 is a section on the line 5—5 of Fig. 2, Fig. 6 is a section on the line 6—6 of the same figure, and Fig. 7 is a section on the line 7—7 also of Fig. 2. Fig. 8 is a plan of the parts immediately connected with the minute-hand spindle on a larger scale and Fig. 9 is an elevation of the same in section on the line 9—9 of Fig. 8.

Mounted on an axle, in the present instance the minute-hand axle A of clock-work mechanism, is a pinion A' (see Fig. 2) which represents in this embodiment the cannon pinion, and with it gears a minute wheel B mounted on a shaft B'. On this shaft B' are also mounted two pinions $B^2$ $B^3$ the pinion $B^2$ being in constant mesh with the 24-hour wheel C and the pinion $B^3$ with the 12-hour wheel D. A snail C' (see Figs. 2 and 6) is mounted on the axle $c$ of the wheel C and is rotated by the said wheel, at the same time it is permitted a certain amount of movement relatively to the wheel. To accomplish this a stud $C^2$ is provided on the side of the wheel C and enters a slot $C^3$ in the snail. The stud is pressed against one end of the slot by a spring $C^6$ attached to the snail. Bearing on the snail C' is a lever E which is mounted upon a shaft $e$ carried by the side plates see Fig. 2. The lever is kept in constant contact with the snail by a spring $E^2$ (see Figs. 1 and 4). Arms E' are also mounted on the shaft $e$ and carry an armature $E^3$ which is adapted to be attracted by an electro-magnet F when this lever by the rotation of the snail C' is raised a suitable distance for the magnet to attract it. The electro-magnet which is in the electric circuit is supplied from any suitable generator, conveniently the local public supply.

The lever E' which engages the snail is also provided with a contact point $E^4$ (see Fig. 4) which is adapted, when the lever is raised and contact established with the electromagnet F, to make contact between two mutually insulated blades $E^5$ $E^6$ (see Figs. 1, 2 and 3). These blades are carried conveniently in the manner illustrated in Fig. 3 and are so connected with the circuit that when the point $E^4$ makes contact with the two blades the first half of the electric circuit is completed.

$E^7$ is a curved arm or extension carried by the lever E' and is provided with teeth or projections $E^8$ adapted to engage with teeth or studs G' of a rotary star wheel or disk G. These studs effect the rotation of this star wheel in a manner hereinafter described. The star wheel G is carried on a rotary shaft $g$ (see Fig. 5) mounted between the front and back plates of the mechanism, and the teeth G' on the wheel are adapted to pass at the proper moment between two radial guides H (see Figs. 1, 4, 5 and 7) on a disk H' mounted on the minute-hand axle A.

As the amplitude of motion of the projection $E^8$ is equal to the distance between two of the studs G' on the wheel G, when the armature $E^3$ is released by the breaking of the contact falls, from the magnet F carrying the levers E E' with it, the stud $E^8$ engages one or other of the teeth on the star wheel and rotates it through a portion of its revolution equal to the distance between two of the teeth. During this rotation one of the teeth of the star wheel passes between the two contracting radial guides H on the disk H' and since the narrow end of the guide is a good working fit with the studs the passage of this stud brings the disk H', with it the axle A and hence the minute hand $A^5$ fixed to the said axle to a precise angular position which corresponds with the correct time, as determined by the standard clock in the system.

A spring $G^2$ bears against the star wheel G and serves to return this wheel to its normal position when it has been moved in the direction in which it does not act to regulate the mechanism; such a motion is imparted to the wheel when the levers E E' are raised by the snail C' to make contact with the magnet F. The teeth E⁸ on the arm E⁷ are not moved out of the path of the wheel, and therefore during the rising of the levers E E' they engage with the teeth of the wheel and rotate it in a backward direction, but the wheel is not turned sufficiently far to overcome the spring G², which whenever the teeth are moved out of contact with the wheel return it to its normal position.

There is another break in the circuit which is closed by the action of levers J J', (see Figs. 1, 2, 4, 5 and 7), which are mounted upon a common shaft $j$. The lever J has a pin J², (see Figs. 2 and 7) one end of which is adapted to bear on the periphery of a cam A² carried by the minute hand wheel axle A. The other end (see Fig. 1) of the pin J² bears upon the periphery of a collar C⁴ which has a notch C⁵ and is secured to the 24-hour wheel C (see Fig. 7). The cam A² has two shoulders A³ and A⁴ between which is a portion A⁵ whose periphery is concentric with the axis of rotation of the cam. This concentric portion on the cam rotates under the pin J² and is sufficiently long to occupy about ten minutes in its travel under the pin. The other lever J' carries a pin J³ which normally contacts with a spring blade K (see Fig. 3) and holds it away from another spring contact blade K', both blades K K' being located in the electric circuit. The spring contact blade K bearing upon the pin J³ of the lever J' operates on both levers J and J' so that the pin J² is maintained in contact with the collar C⁴.

The operation of the device is as follows:—The pinion A' through the minute wheel B and its engaging pinion B² rotates the wheel C once in twenty-four hours. The snail C' is carried round with the wheel and as it rotates raises the levers E and E' so that the armature E³ carried by the levers E is gradually raised to the magnet F. Shortly before the completion of this 24-hour period the pin J² carried by the lever J falls over the shoulder A³ on the cam A², at the same time the other end of the pin enters the notch C⁵ in the collar C⁴ which has rotated to the proper position for this action. By this movement the pin J³ on the arm J' is moved to allow the blade K to come into contact with the blade K', thus closing this second switch in the circuit. This completion of circuit energizes the magnet F which now attracts the armature E³, the latter having been brought sufficiently close to it to be attracted, and being held up by the magnet the levers E E', are retained in this position until the circuit is broken. During the rotation of the snail the lever E' bearing upon it acts with a braking effect so that the snail is rotated by the wheel C, the pin in which bears against the forward end of the slot C³ in the snail, that is to say the opposite end of the slot to that shown in Fig. 6. During this rotation the spring C² is in tension. When, however, the armature is attracted by the magnet F the lever is moved clear of the snail, and the braking effect being released the snail is carried round by the spring C² sufficient far for the shoulder of the snail to clear the said lever, that is to say into the position shown in Fig. 6.

At the moment of synchronizing the standard clock by means of suitable mechanism opens the main switch. The breaking of the circuit releases the levers E E' so that they fall back to their normal position, that is to say into the position shown in Fig. 1. During this movement the curved arm E⁷ engages by one of its teeth E⁸ with one of the teeth of the star wheel and rotates it through a distance equal to that between two of the projections on the wheel. This rotation of the star wheel forces another projection thereon through the contracting radial guide H on the disk H' and as above stated, thereby brings the minute hand to the precise angular position corresponding to the time indicated.

After the breaking of the circuit one end of the pin J² falls over the second shoulder A⁴ of the cam A² the other end of the pin being still in the slot C⁵ which is deep enough to permit of this movement and the pin J³ is at the same time moved further in the direction of its previous motion to allow the end of the blade K to pass under the bent end or bow K² (see Figs. 1 and 3) of the blade K'. During the further rotation of the cam A², the pin J² is gradually lifted and moves the pin J³ backward carrying the blade K with it. Any contact made between the blades K K' during the return movement of the pin J³ will be of no effect when the contact between the members E⁵ E⁶ E⁴ which constitute the other switch is broken. The parts are now in position to recommence the cycle of operations during the period of twenty four hours.

What we claim as our invention and desire to secure by Letters Patent is:—

1. In electrically synchronized time measuring instruments, the combination with the clock-work mechanism, of a magnet, an armature, a stud G' adapted to move with the said armature, a part adapted to rotate quickly and a contracting radial guide adapted to rotate with such part and to be traversed by the said stud, substantially as and for the purpose set forth.

2. In electrically synchronized time measuring instruments, the combination with the clockwork mechanism, of a snail, means for rotating the said snail, a pivoted lever adapted to bear upon the said snail, a magnet, an armature carried by the said lever, a switch adapted to be closed by the said lever, a series of studs G' adapted to be rotated by the said lever, a part adapted to rotate quickly, and a contracting radial guide adapted to rotate with such part and to be traversed by the said studs, substantially as and for the purpose set forth.

3. In electrically synchronized time measuring instruments the combination with the clockwork mechanism, of a snail, adapted to be rotated by the twenty four hour wheel of such clockwork mechanism, a spring adapted to rotate the said snail in advance of the said twenty four hour wheel, a pivoted lever, provided with a projection, a spring adapted to press the said lever upon the said snail, a magnet, an armature carried by the said lever, a switch adapted to be closed by the said lever, a plate provided with a series of studs G', and adapted to be rotated by the projection on the said lever, a contracting radial guide adapted to rotate with the minute hand of the said clockwork mechanism, and to be traversed by the said studs, substantially as and for the purpose set forth.

4. In electrically synchronized time-measuring instruments, the combination with the clockwork mechanism, of a snail adapted to be rotated by the 24 hour wheel of such clockwork mechanism, a spring adapted to rotate the said snail in advance of the said 24 hour wheel, means for retarding the snail so that its spring is placed under tension, a pivoted lever provided with a projection and engaging the snail, a magnet, an armature carried by the said lever, a switch adapted to be closed by the said lever, means for releasing the retarding device of the snail when the lever closes the switch, a plate provided with a series of studs (G') and adapted to be rotated by the projection on the said lever, and a contracting radial guide adapted to rotate with the minute hand of the said clockwork mechanism and to be traversed by the said studs, substantially as and for the purpose set forth.

5. In electrically synchronized time measuring instruments the combination with the minute hand axle and the twenty four hour wheel of the clockwork mechanism, of a snail adapted to be rotated by the said twenty four hour wheel, a pivoted lever adapted to bear upon the said snail, a magnet, an armature carried by the said lever, a switch adapted to be closed by the said lever, a series of studs G' adapted to be rotated by the said lever, a contracting radial guide adapted to rotate with the minute hand axle and to be traversed by the said studs, a pivoted lever provided with two pins, a cam having two shoulders and adapted to rotate with the said minute hand axle, a collar having a notch and adapted to rotate with the said twenty four hour wheel, and a switch adapted to be operated by the said pin carrying lever, substantially as and for the purpose set forth.

6. In electrically synchronized time measuring instruments the combination with an electric generator, a circuit, a main switch, and a minute hand axle, and the twenty four hour wheel of the clock mechanism, of a snail adapted to be rotated by the said twenty four hour wheel, a spring adapted to rotate the said snail in advance of the said twenty-four hour wheel, a pivoted lever provided with a projection, a spring adapted to press the said lever upon the said snail, a magnet, an armature carried by the said lever, a switch adapted to be closed by the said lever, a plate provided with a series of studs G' and adapted to be rotated by the projection on the said lever, a disk fitted to the minute hand axle and provided with a contracting radial guide adapted to be traversed by the studs on the said plate, a pivoted lever provided with two pins, a cam having two shoulders, fixed to the minute hand axle and adapted to be borne upon by one of the said pins, a collar fixed to the said twenty four hour wheel and having a notch adapted to receive one of the said pins, and a switch adapted to be operated by the said pin-carrying lever, substantially as and for the purpose set forth.

In testimony whereof we have signed our names to this specification in the presence of two subscribing witnesses.

BAHNE BONNIKSEN.
FREDERICK AUGUSTUS CHANDLER.

Witnesses:
DOUGLAS LEECHMAN,
E. HARKER.